United States Patent
Nishimura

(10) Patent No.: US 8,149,428 B2
(45) Date of Patent: Apr. 3, 2012

(54) PRINT CONTROLLING APPARATUS AND INFORMATION PROCESSING APPARATUS

(75) Inventor: Kiyotaka Nishimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1037 days.

(21) Appl. No.: 12/080,367

(22) Filed: Apr. 1, 2008

(65) Prior Publication Data

US 2009/0091781 A1    Apr. 9, 2009

(30) Foreign Application Priority Data

Apr. 2, 2007   (JP) ................. 2007-096181
Mar. 5, 2008   (JP) ................. 2008-055101

(51) Int. Cl.
G06F 15/00 (2006.01)
G06F 3/12 (2006.01)
G06K 1/00 (2006.01)

(52) U.S. Cl. ..................... 358/1.13; 358/1.15

(58) Field of Classification Search .............. None
See application file for complete search history.

(56) References Cited

U.S. PATENT DOCUMENTS

2002/0097432 A1   7/2002   Kumashio
2004/0136023 A1*  7/2004   Sato .................. 358/1.13

FOREIGN PATENT DOCUMENTS

| JP | 07-164686 A | 6/1995 |
| JP | 2002-215353 A | 8/2002 |
| JP | 2004-192625 | 7/2004 |
| JP | 2006-285870 | 10/2006 |
| JP | 2007042053 A | 2/2007 |

* cited by examiner

Primary Examiner — Douglas Tran
(74) Attorney, Agent, or Firm — Nutter McClennen & Fish LLP; John J. Penny, V.

(57) ABSTRACT

To restrain that an adjustment is performed by a printer driver by matching an order for setting items by a user and a priority order between the items when an adjustment is performed by a printer driver.

4 Claims, 10 Drawing Sheets

FIG. 2

PrintTicket  100

```xml
<?xml version="1.0" encoding="UTF-8" ?>
<psf:PrintTicket xmlns:psf="http://schemas.microsoft.com/windows/2003/08/printing/
printschemaframework"
        xmlns:xsi="http://www.w3.org/2001/XMLSchema-instance"
        xmlns:xsd="http://www.w3.org/2001/XMLSchema" version="1"
     xmlns:ns0000="http://schemas.microsoft.com/windows/printing/oemdriverpt/
ES_LNseries_PowerPrinter"
        xmlns:psk="http://schemas.microsoft.com/windows/2003/08/printing/
printschemakeywords">
  <psf:ParameterInit name="ns0000:PageDevmodeSnapshot">
    <psf:Value>SABQACAARAB1AHMDFDFJASKJFDUETgEAAAA=</psf:Value>
  </psf:ParameterInit>
  . . .
  <psf:Feature name="psk:PageMediaSize">
    <psf:Option name="psk:ISOA4">
      <psf:ScoredProperty name="psk:MediaSizeWidth">
        <psf:Value xsi:type="xs:integer">210000</psf:Value>
      </psf:ScoredProperty>
      <psf:ScoredProperty name="psk:MediaSizeHeight">
        <psf:Value xsi:type="xs:integer">297000</psf:Value>
      </psf:ScoredProperty>
    </psf:Option>
  </psf:Feature>
  . . .
  <psf:Feature name="psk:JobInputBin">
    <psf:Option name="psk:AutoSelect" />
  </psf:Feature>
  . . .
</psf:PrintTicket>
```

110 { PageMediaSize block }
120 { JobInputBin block }

PAPER SIZE: A4, PAPER FEEDER: AutoSelect IS SET

FIG. 3A

VENDOR SPECIFIC XML DOCUMENT  150

```
<psf:Feature name="psk:FeaturePriority">
  <psf:Option name="psk:JobInputBin"></psf:Option>     ← PAPER FEEDER
  <psf:Option name=" psk:PageMediaSize "></psf:Option>  ← PAPER SIZE
  . . . .
</psf:Feature>
```

PRIORITY ORDER OF PAPER FEEDER IS HIGHER THAN THAT OF PAPER SIZE

FIG. 3B

```
<psf:Feature name="psk:FeaturePriority">
  <psf:Option name=" psk:PageMediaSize "></psf:Option>  ← PAPER SIZE
  <psf:Option name="psk:JobInputBin"></psf:Option>     ← PAPER FEEDER
  . . . .
</psf:Feature>
```

PRIORITY ORDER OF PAPER SIZE IS HIGHER THAN THAT OF PAPER FEEDER

FIG. 4

PrintCapabilities RELATED TO PAPER SIZE  200

```
<psf:Feature name="psk:PageMediaSize">
  <psf:Property name="psf:SelectionType">
    <psf:Value xsi:type="xs:string">psk:PickOne</psf:Value>
  </psf:Property>
  <psf:Option name="psk:ISOA4">                              ⎫
    <psf:ScoredProperty name="psk:MediaSizeWidth">           |
      <psf:Value xsi:type="xs:integer">210000</psf:Value>    |
    </psf:ScoredProperty>                                    | 210
    <psf:ScoredProperty name="psk:MediaSizeHeight">          |
      <psf:Value xsi:type="xs:integer">297000</psf:Value>    |
    </psf:ScoredProperty>                                    |
  </psf:Option>                                              ⎭
  <psf:Option name="psk:ISOA5">                              ⎫
    . . .                                                     > 220
  </psf:Option>                                              ⎭
  <psf:Option name="psk:JapanHagakiPostcard">                ⎫
    . . .                                                     > 230
  </psf:Option>                                              ⎭
  <psf:Option name="psk:JapanChou3Envelope">                 ⎫
    . . .                                                     > 240
  </psf:Option>                                              ⎭
</psf:Feature>
```

SETTING VALUES WHICH CAN BE SELECTED ARE A4, A5, POSTCARD, CHOU 3 ENVELOPE

FIG. 5

PrintCapabilities RELATED TO PAPER FEEDER  300

```
<psf:Feature name="psk:JobInputBin">
  <psf:Property name="psf:SelectionType">
    <psf:Value xsi:type="xs:string">psk:PickOne</psf:Value>
  </psf:Property>
  <psf:Option name="psk:AutoSelect">      ⎫
  . . .                                    ⎬ 310
  </psf:Option>                            ⎭
  <psf:Option name="psk:Manual">          ⎫
  . . .                                    ⎬ 320
  </psf:Option>                            ⎭
  <psf:Option name="psk:Cassette">        ⎫
  . . .                                    ⎬ 330
  </psf:Option>                            ⎭
  <psf:Option name="psk:Tractor">         ⎫
  . . .                                    ⎬ 340
  </psf:Option>                            ⎭
  <psf:Option name="psk:AutoSheetFeeder"> ⎫
  . . .                                    ⎬ 350
  </psf:Option>                            ⎭
</psf:Feature>
```

SETTING VALUES WHICH CAN BE SELECTED ARE AutoSelect, Manual, Cassette, Tactor, AutoSheetFeeder

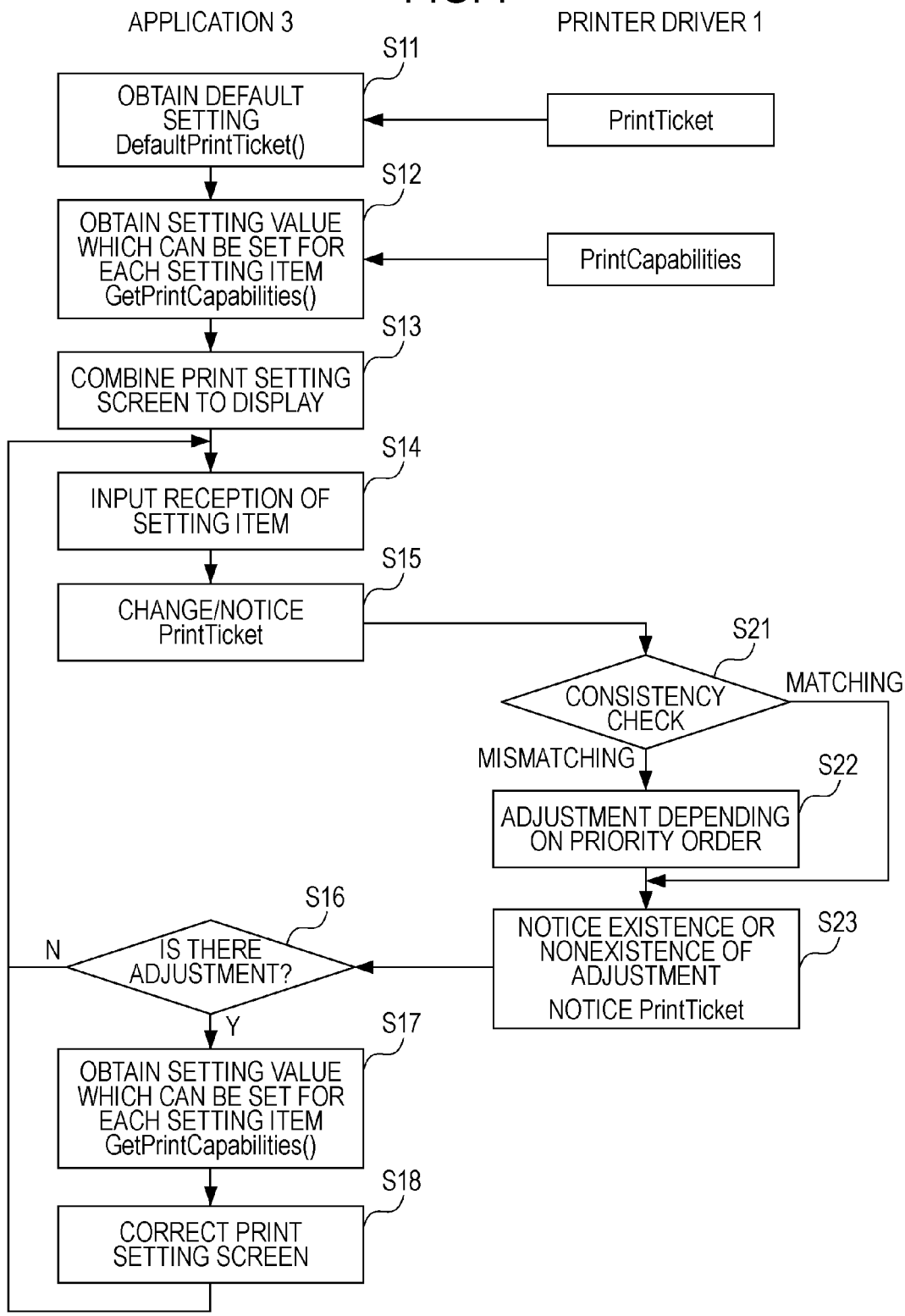

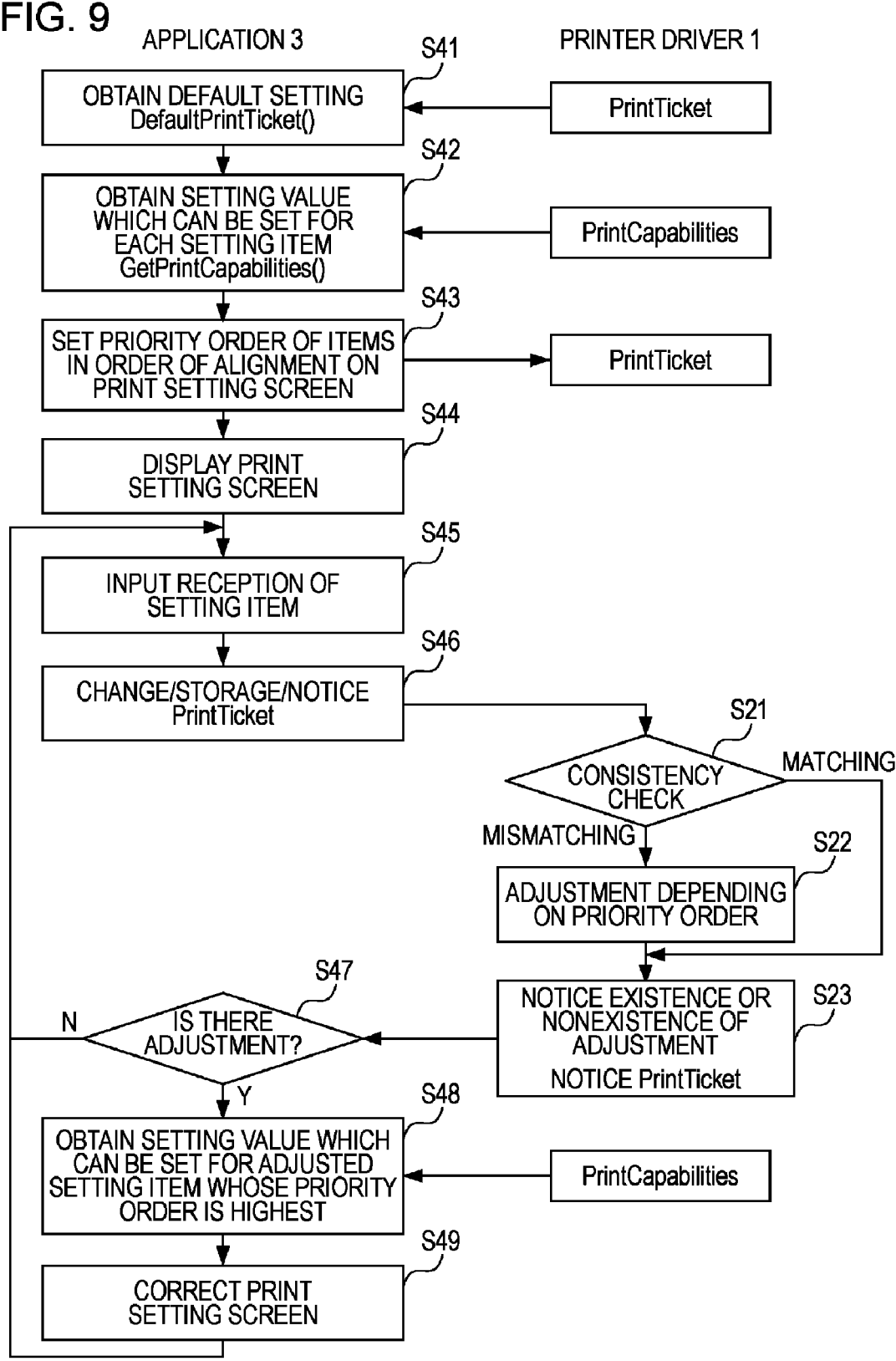

PRINT CONTROLLING APPARATUS AND INFORMATION PROCESSING APPARATUS

The entire disclosure of Japanese Patent Application Nos: 2007-096181, filed Apr. 2, 2007 and 2008-055101, filed Mar. 5, 2008 are expressly incorporated by reference herein.

BACKGROUND

1. Technical Field

The present invention relates to a print setting by a printer driver and, in particular, to a technique by which a setting value is not forcibly changed by an adjustment when user sequentially sets a plurality of items.

2. Related Art

In the Windows Vista (registered trademark or trademark) from Microsoft, a specification called a PrintTicket for administrating setting information for a device such as a printer which had been administrated by a DEVMODE structure in the past with an XML (eXtensible Markup Language) has been introduced (for example, Patent Document 1).

[Patent Document 1] JP-A-2006-285870

Each setting item for print setting contained in the PrintTicket can be respectively separately set from among preliminarily selected choices. Herein, there is a case that a predetermined dependence relationship exists between certain items. For example, there exists a combination which can not be selected at the same time as for the setting values for a plurality of items like the combination of envelop printing and no-margin printing or the like. If the setting values are selected at the same time, a printer driver prioritizes any one of the items in accordance with a predetermined priority order and performs an adjustment for forcibly changing the setting for the other item to provide consistency between the items.

If such an adjustment is performed, a setting value is to be forcibly changed for the item to which a user once performs setting, for example, on a print setting screen of an application. The change is not necessary performed so as to reflect an intention of the user, so that the user may start the setting from the beginning again.

Further in the standard of the PrintTicket, it is impossible to know a priority order of the adjustment performed by the printer driver.

SUMMARY

Consequently, an object of the invention is to restrain a change of a setting value of a setting item occurred by performing an adjustment by a printer driver by matching an order when a user sets items and an priority order between the items when an adjustment is performed by the printer driver.

A print controlling apparatus for controlling a printer based on a print request from an application according to an embodiment of the invention is equipped with means for outputting a first notification including a setting values for each of a plurality of setting items and a priority order of the plurality of setting items in response to a request form the application, means for outputting a second notification showing values which can be set as a setting value for each setting item according to the first notification in response to a request form the application, means for obtaining a third notification that includes the setting value for each of the plurality of setting items and includes a changed setting value changed by the application, adjustment means for judging consistency of the setting values between the plurality of setting items of the obtained third notification, and when there is inconsistency, changing a setting value in accordance with the priority order of the plurality of setting items so that the setting values between the plurality of setting items satisfy consistency, and execution means for causing the printer to execute printing by performing a control based on the setting value for each of the plurality of setting items satisfying consistency when a print request is received from the application.

A print controlling apparatus for controlling a printer based on a print request from an application according to an embodiment of the invention is equipped with means for outputting a first notification including a setting value for each of a plurality of setting items in response to a request form an application, means for obtaining a third notification related to a setting value for any of the setting items and a specification of a priority order of the plurality of setting items from the application, adjustment means for judging consistency of the setting values between the plurality of setting items of the obtained third notification, and when there is inconsistency, changing a setting value in accordance with the priority order of the plurality of setting items obtained by the third notification so that the setting values between the plurality of setting items satisfy consistency, and execution means for causing the printer to execute printing by performing a control based on the setting value for each of the plurality of setting items satisfying consistency when a print request is received from the application.

An information processing device for issuing a print request to the print controlling apparatus according to an embodiment of the invention is equipped with means for obtaining a first notification including a setting value for each of a plurality of setting items and a priority order of the plurality of setting items from the print controlling apparatus, means for obtaining a second notification showing values which can be set as a setting value for each setting item according to the first notification from the print controlling apparatus, means for combining and displaying a print setting screen on which the setting item whose priority order of the plurality of setting items contained in the obtained first notification is higher becomes an upper position, and means for creating a third notification including a setting value selected by a user from among the setting values which can be selected for each setting item included in the obtained second notification in the print setting screen and for transmitting the third notification to the print setting apparatus.

In a preferable embodiment, the means for obtaining the second notification may obtain the second notification for each time a setting value for one setting item is selected.

In a preferable embodiment, each of the first notification and the third notification may be a PrintTicket, and the second notification may be PrintCapabilities.

An information processing device for issuing a print request to the print controlling apparatus according to an embodiment of the invention is equipped with means for obtaining a first notification including a setting value for each of a plurality of setting items and a priority order of the plurality of setting items from the print controlling apparatus, means for changing the priority order of the plurality of setting items included in the obtained first notification and for transmitting a second notification including a changed priority order of the plurality of setting items to the print controlling apparatus, and means for creating a third notification including a setting value for each setting item set in accordance with the changed priority order of the plurality of setting items and for transmitting the third notification to the print controlling apparatus.

In a preferable embodiment, means for generating and displaying a print setting screen for receiving a selection of a setting value for each of the setting items from a user may be further included and the priority order of the second notification may be set so that the priority order of an setting item becomes higher as the setting item is disposed higher in the print setting screen.

In a preferable embodiment, further included are means for obtaining a fourth notification including the setting value for each of the plurality of setting items in the print controlling apparatus from the print controlling apparatus after the third notification is transmitted to the print controlling apparatus, means for judging whether there is a setting item whose setting value is changed from the setting value included in the first notification among the setting value for each of the plurality of setting items included in the obtained fourth notification, and means for obtaining a fifth notification showing values which can be set as a setting value for the setting item whose setting value is changed from the print controlling apparatus when there is a setting item whose setting value is changed as a result of the judgment. Then, a setting value included in the obtained fifth notification and set for the setting item whose setting value is changed from the setting value in the first notification may be offered as a setting value which can be selected for the setting item whose setting value is changed on the print setting screen.

Note that in any aspect, each of Nth notification (N is 1 to 5) may be constituted by one notification, or may be constituted by a plurality of notifications. Further, not less than two of Nth's notifications may be notified at once.

BRIEF DESCRIPTION OF THE DRAWINGS

FIG. 2 shows an example of a PrintTicket 100;
FIG. 3 shows an example of a vendor specific XML document 150 showing a priority order between setting items to be added to the PrintTicket 100;
FIG. 4 shows an example of PrintCapabilities 200;
FIG. 5 shows an example of PrintCapabilities 300;
FIG. 7 is a flow chart showing a procedure of a first aspect;
FIG. 9 is a flow chart showing a procedure of a third aspect.

DESCRIPTION OF EXEMPLARY EMBODIMENTS

Hereinafter, a printing system according to an embodiment of the invention will be described with reference to the drawings.

Figure 1:
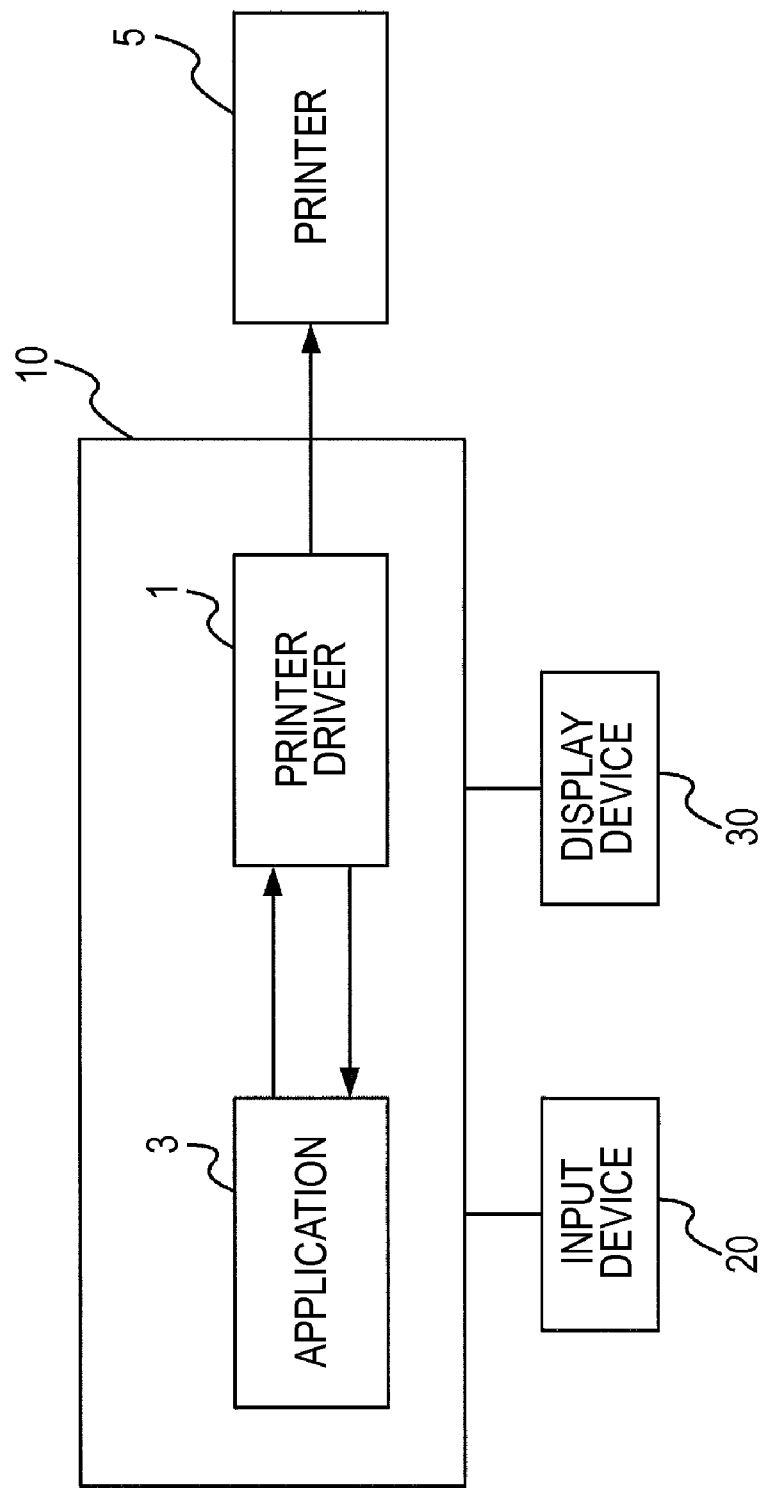
FIG. 1 is a configuration diagram showing a print system according to an embodiment of the invention.

FIG. 1 is a configuration diagram of a printing system according to the embodiment. The system is equipped with a print controlling apparatus 10 and a printer 5 as shown in the drawing. An input device 20 and a display device 30 are connected to the print controlling apparatus 10. The print controlling apparatus 10 is equipped with a printer driver 1 and an application 3.

The print controlling apparatus 10 is constituted by, for example, a versatile computer system, and the printer driver 1 and the application 3 in the print controlling apparatus 10 are provided by, for example, performing a computer program.

The printer driver 1 controls the printer 5 to execute printing in response to a print request from the application 3. Further, the printer driver 1 administrates configuration information for the printer 5 by a PrintTicket.

The application 3 transmits a print request to the printer driver 1 to request a printing. Further, the application 3 displays a predetermined print setting screen on the display device 30 and receives various inputs performed to the screen by using the input device 20 by the user.

The application 3 obtains a PrintTicket from the printer driver 1 and recognizes a setting of the printer driver 1 of the moment. Further, the application 3 obtains PrintCapabilities that shows a value which can be set as a setting value of each setting item from the printer driver 1. The application 3 refers to the PrintCapabilities and changes the setting value of the setting items for the printer driver 1. Further, the application 3 transmits the changed PrintTicket to the printer driver 1. Herewith, the application 3 can change the setting of the printer driver 1.

FIG. 2 shows an example of a PrintTicket 100 that complies with the standard specification.

The PrintTicket 100 is described by an XML, and a setting value of the moment in the printer driver 1 is described. In the example shown in the drawing, "A4" is set as a paper size by an XML document 110 and "AutoSelect" is set as a paper feeder by an XML document 120.

In the embodiment, the standard specification of the PrintTicket is expanded to add the PrintTicket 100 of FIG. 2 to a vendor specific XML document (see FIG. 3) that shows a priority order between setting items. Herein, the priority order is a priority order as to which setting item is to be prioritized when performing an adjustment for preventing inconsistency between the setting items.

In the plurality of setting items for the printer driver 1, there are setting items having a dependence relationship in which one of setting influences the other setting. For example, when one of the setting items is set to a certain value, values which can be set as the other setting item is restricted. Specifically, when paper size capable of no-margin printing is restricted, a paper size for which no-margin printing can not be performed is selected even when no-margin printing is specified.

In order to prevent such the inconsistency between the setting items, the printer 1 prioritizes one of setting items in accordance with the aforementioned priority order and performs an adjustment for changing the setting for other setting item.

FIG. 3 shows an example of a vendor specific XML document 150 showing a priority order between setting items to be added to the PrintTicket 100. In the example shown in the drawing, the described position of the item is higher as the priority order is higher. That is, the priority order of the paper feeder is higher than that of the paper size in the XML document 150 of FIG. 3A. On the contrary, the priority order of the paper size is higher than that of the paper feeder in the XML document 150 of FIG. 3B.

FIG. 4 and FIG. 5 show an example of PrintCapabilities 200, 300.

Each of the PrintCapabilities 200, 300 is described by an XML. The PrintCapabilities 200 is the one that relates to a paper size, and the PrintCapabilities 300 is the one that relates to a paper feed device.

In the PrintCapabilities 200 of FIG. 4, as for the paper size which can be set as a print paper, "A4" is set by an XML document 210, "A5" is set by an XML document 220, "postcard" is set by an XML document 230, and "Chou 3 envelope A4" is set by an XML document 240 respectively.

In the PrintCapabilities 300 of FIG. 5, as for the vales which can be set for setting of the paper feeder, "AutoSelect" is set by an XML document 310, "Manual" is set by an XML document 320, "Cassette" is set by an XML document 330, "Tactor" is set by an XML document 340, and "AutoSheet-Feeder" is set by an XML document 350 respectively.

For example, when changing the setting of the paper size, the application 3 rewrites the XML document 110 of the PrintTicket 100 to any of the paper sizes described in the PrintCapabilities 200. Further, when the setting of the paper feeder is changed, the application 3 similarly rewrites the XML document 110 of the PrintTicket 100 to any of the paper feed device described in the PrintCapabilities 200.

Next, FIG. 6 shows an example of a print setting screen 500 provided by the application 3. Item names 510 of the items to which setting is performed by the user, and areas 520 for inputting setting value of each item are displayed on the print setting screen 500. The input area 520 is, for example, displayed in the form of a pull down list, and choices capable to be set in each item are displayed.

Figure 6A:
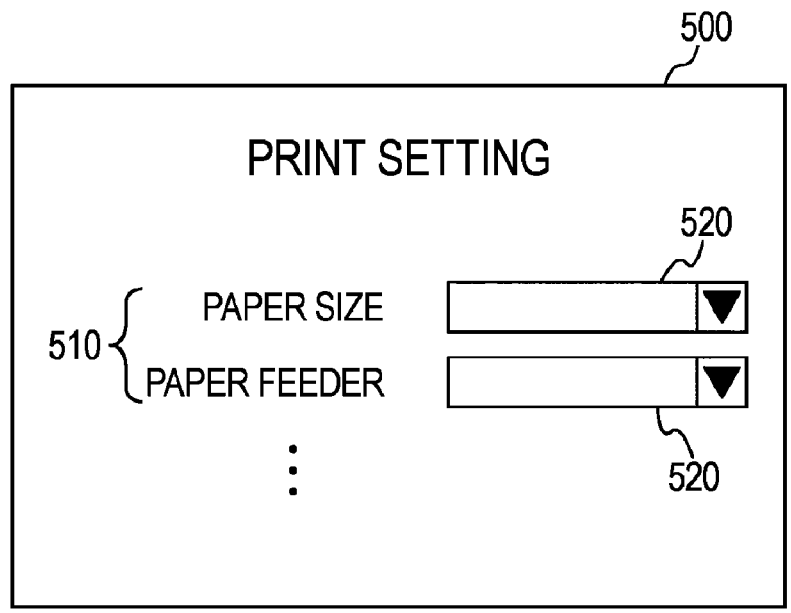
FIG. 6 shows an example of a print setting screen 500 provided by an application 3.
Figure 6B:
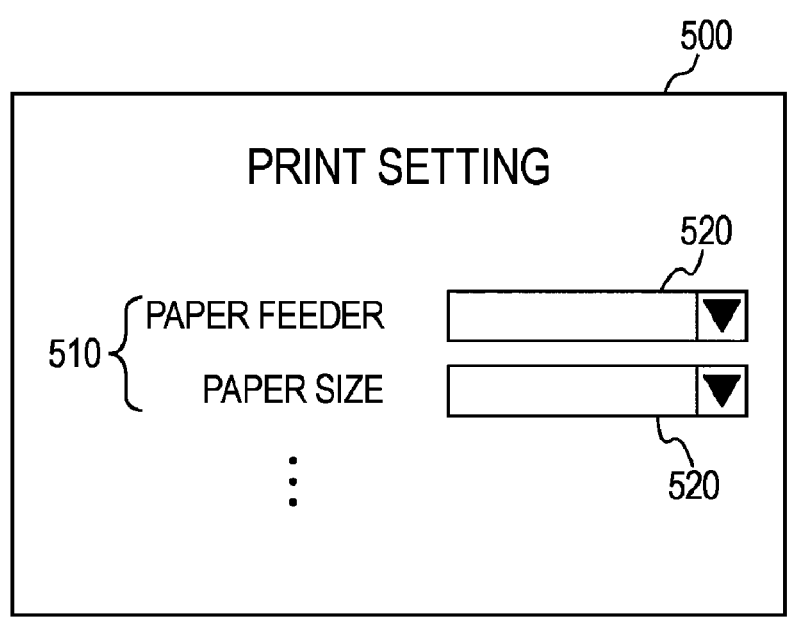

In a first aspect of the embodiment shown in FIG. 7, the application 3 changes display positions of the items which should be displayed on the print setting screen 500 in accordance with a priority order between the setting items. That is, the application 3 assigns the item at a higher position on the print setting screen 500 as the priority order becomes higher. For example, when the items are aligned in the up and down direction as shown in FIG. 6, the item is displayed so as to be positioned closer to the upper side as the priority order becomes higher. On the contrary to FIG. 6, when the items are aligned in the left and right direction, the item may be displayed so as to be positioned closer to the left side as the priority order becomes higher. Accordingly, FIG. 6A is an example in the case where the priority order of the paper size is higher than that of the paper feeder, and FIG. 6B is an example in the case where the priority order of the paper feeder is higher than that of the paper size.

Figure 8:
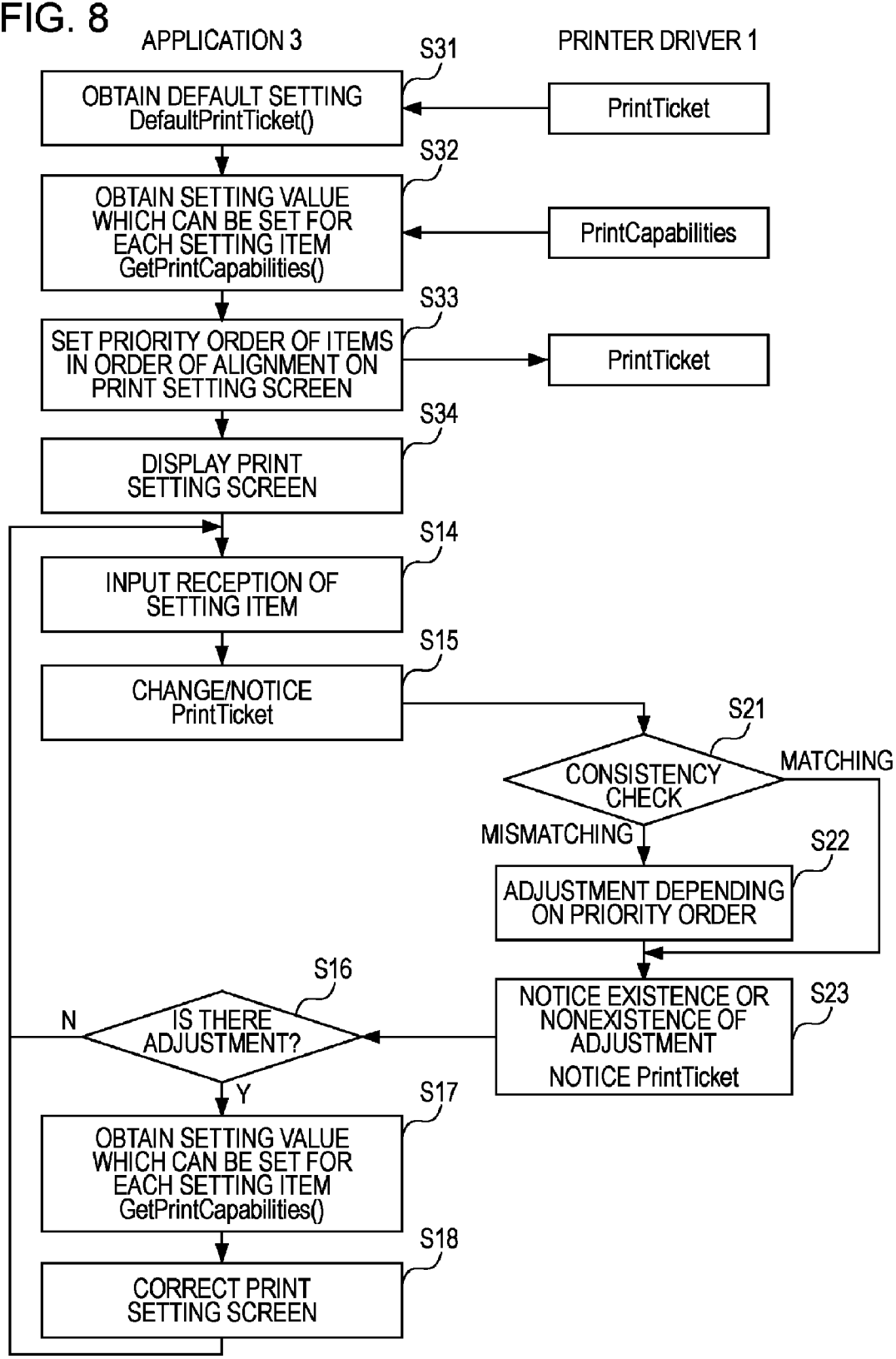
FIG. 8 is a flow chart showing a procedure of a second aspect.

Further, in the second aspect of the embodiment shown in FIG. 8, the application 3 preliminarily defines the print setting screen 500, and sets the priority order between the items so as to match with the print setting screen 500.

In any of the aspects, when any of choices is selected to be set in the input area 520 for the upper item, choices displayed in the pull down list of the input area 520 of the lower item is changed in accordance with the setting value of the upper item. That is, only the choice capable to be set with respect to the setting value of the upper item is displayed in the pull down list of the lower item.

Next, a procedure of the first aspect of the embodiment will be described with reference to the flow chart in FIG. 7.

In the aspect, the application 3 changes the print setting screen 500 so as to match with the priority order of the printer driver 1.

First, the application 3 obtains a PrintTicket of default from the printer driver 1 by a DefaultPrintTicket( ) to recognize the setting of the printer driver 1 of the moment (S11). Further, the application 3 obtains PrintCapabilities from the printer driver 1 by GetPrintCapabilities( ) to recognize a view of setting vales which can be set for each setting item (S12).

Further, the application 3 analyses the XML 150 in which the priority order of the setting items is described that is contained in the PrintTicket obtained by the aforementioned process, combines a print setting screen so that the setting item specified in the XML 150 whose priority order is higher becomes an upper position, and displays on the display device 30 (S13).

When the user sets a setting value selected from the pull down list in the input area 520 for any setting item in the print setting screen 500, the application 3 receives the setting value (S14).

The application 3 changes the existing setting value described in the PrintTicket to the received setting value. Then, the application 3 transmits the changed PrintTicket to the printer driver 1 (step S15).

The printer driver 1 receives the changed PrintTicket that is changed by the application 3 and checks the consistency of setting values of each setting item, and performs an adjustment in accordance with the priority order when there is inconsistency (S21, S22). The printer driver 1 transmits the PrintTicket available in the moment to the application 3 (step S23).

When the PrintTicket transmitted from the printer driver 1 is received, the application 3 compares the received PrintTicket and the PrintTicket previously transmitted, and judges whether an adjustment is performed or not in the printer driver 1 (step S16). When judged that the adjustment is not performed (S16: No), the procedure returns to step S14.

On the other hand, when judged that an adjustment is performed in the printer driver (S16: Yes), the application 3 obtains PrintCapabilities from the printer driver 1 again by GetPrintCapabilities( ) (S17). Then the application 3 corrects the setting of the print setting screen 500 so that only the choices capable to be set are to be displayed in the pull down list as for the item lower than the item that is already set in the print setting screen 500 and the item to which an adjustment is performed by the printer driver 1 (S18). Then, the procedure returns to step S14 and the procedure is continued.

Herewith, when choices are sequentially set from the upper item, choices displayed in the pull down list of the input region 520 for the lower item are changed in accordance with the setting value of the upper item. As a result, when the user sequentially sets the items from the upper one, no adjustment is performed by the printer driver 1 as a general rule. Accordingly, as for the item that is once set by the user, there is no case that the setting is reversed by the printer driver 1, and it is possible to determine the print setting without performing resetting by the user.

Note that, when it is detected that an adjustment is performed in step S16, a message for notifying the user as for the detection may be output.

Further, in the aforementioned flow chart, the flow after step S15 may be performed for each time one item is set or may be performed when all of the items are set. However, in this case, even when the item is once set by the user, it may occur that the setting is reversed by the printer driver 1.

Next, a procedure of the second aspect of the embodiment will be described with reference to the flow chart in FIG. 8. In the aspect, the printer driver 1 performs an adjustment in accordance with the priority order specified by the application 3. The priority order of the item specified by the application 3 is set higher as the item on the preliminarily set print setting screen is disposed higher.

First, similarly to the first aspect, the application 3 obtains a PrintTicket of default from the printer driver 1 by a Default- PrintTicket( ) to recognize the setting of the printer driver 1 of the moment (S31). Further, the application 3 obtains Print-Capabilities from the printer driver 1 by GetPrintCapabilities( ) to recognize a view of setting vales which can be set for each setting item (S32).

Herein, the application 3 changes the XML 150 in which a priority order of setting items is described that is contained in the PrintTicket obtained in step S31 in accordance with a disposed order of each item disposed on the print setting screen 500 to transmits to the printer driver 1 (S33). Herewith the priority order of each item in the printer driver 1 is changed. At this time, the printer driver 1 may judge whether the change of the priority order can be accepted or not to notice the result to the application 3 similarly to the steps S21 to S23.

Then, the application 3 displays the print setting screen 500 (S34).

The processes thereafter are the same as the first aspect. In the embodiment, since the priority order of the default defined by a Print Ticket stored by the printer driver 1 is changed to the priority order specified by the application 3, an adjustment is performed in accordance with the priority order specified by the application 3 in step S22. However, the change of the priority order which cannot be admitted by the printer driver 1 is ignored.

Note that the procedure may be employed in which the notification of the PrintTicket performed in step S33 is omitted and the notification of the change of the priority order of each item is performed after the value for the item is set in step S15 and with the notification of the setting value.

Herewith, it is possible to determine setting values for the plurality of setting items by the priority order that follows the definition of the print setting screen 500 provided by the application 3.

Next, a procedure of a third aspect of the embodiment will be described with reference to a flow chart in FIG. 9. In the aspect, when an adjustment is performed by the printer driver 1 to a certain setting item, whether setting of another setting value is possible or not with respect to the setting item to which the adjustment is performed can be confirmed by the user by a try and error.

First, similarly to the fist and the second aspects, the application 3 obtains a PrintTicket of default from the printer driver 1 by a DefaultPrintTicket( ) to recognize the setting of the printer driver 1 of the moment (S41). Further, the application 3 obtains PrintCapabilities from the printer driver 1 by GetPrintCapabilities( ) to recognize a view of setting vales which can be set for each setting item (S42).

Herein, the application 3 changes the XML 150 in which a priority order of setting items contained in the PrintTicket obtained in step S41 based on a disposed order of each item disposed on the print setting screen 500 to transmit to the printer driver 1 (S43). Herewith, the priority order of each item in the printer driver 1 is changed. At this time, in the printer driver 1, similarly to the steps S21 to S23, whether the change of the priority order can be accepted or not may be judged to notice the result to the application 3.

Then, the application 3 displays the print setting screen 500 (S44).

In the print setting screen 500, when the user sets the setting value selected from the pull down list in the input region 520 of any of the setting items, the application 3 receives the setting value (S45).

The application 3 changes the existing setting value described in the PrintTicket to the setting value received here (S45). Then, the application 3 temporarily stores the changed PrintTicket and transmits to the printer driver 1 (S46).

Herein, the process performed by the printer driver 1 is the same as the first embodiment. That is, the printer driver 1 receives the PrintTicket changed by the application 3 and checks consistency of the setting values for each setting item, and performs an adjustment in accordance with the priority order when there is inconsistency (S21, S22). The printer driver 1 transmits the PrintTicket available at the moment to the application 3 (S23).

When the PrintTicket transmitted from the printer driver 1 is received, the application 3 compares the received PrintTicket with the PrintTicket temporally stored to judge whether an adjustment is performed by the printer driver 1 or not (S47). When an adjustment is not performed (S47: No), the procedure returns to step S45.

On the other hand, when an adjustment is performed by the printer driver 1 (S47: Yes), the application 3 specifies the setting item to which an adjustment is performed. In the case where a plurality of setting items is adjusted, the setting item whose priority order is highest is specified from among the setting items. Then, the application 3 obtains setting values (PrintCapabilities) which can be set for the setting item specified here from the printer driver 1 (S48). The setting values obtained here may include only the setting values which can be set in consideration for a dependence relationship between with the setting values for the setting item whose priority order is higher.

Then, the application 3 corrects the print setting screen 500 so that the setting values in which the setting values set in the PrintTicket stored in step S46 are eliminated from the setting values obtained in step S48 are to be displayed in the pull down list as choices that can be set as for the setting items specified in step S47 in the print setting screen 500 (S49). Then, the procedure goes back to step S45 to continue the process.

FIG. 10 shows a display example of the print setting screen 500 when a process is performed in accordance with the aforementioned second embodiment. In the example of FIG. 10, the priority order of the "paper size" is higher than that of the "paper feeder".

First, in the print setting screen 500a shown in FIG. 1A, "A4" is set in an input area 521 for the "paper size" and "Autoselect" is set in an input are 523 for the "paper feeder" (step S45 in FIG. 9). Note that setting values which can be set in the input area 523 are "AutoSelect", "cassette A", and "cassette B" shown in the pull down list of the drawing. The PrintTicket is changed in accordance with the setting value set here and the changed PrintTicket is stored and notified to the printer driver 1 (step S46 in FIG. 9).

In the printer driver 1, by the processes of steps S21 to S23 of FIG. 9, the "paper size" shall be adjusted to "A4" and the "paper feeder" shall be adjusted to "cassette A". That is, when the "paper size" is "A4", "AutoSelect" shall not be selected for the "paper feeder".

As the result, when it is detected that the PrintTicket notified from the printer driver 1 is adjusted (step S47 of FIG. 9), the application 3 specifies that the adjusted item is the "paper feeder" and obtains setting values (PrintCapabilities) which can be set for the "paper feeder" (step S48 of FIG. 9).

If "AutoSelect", "cassette A", and "cassette B" are included in the PrintCapabilities for the "paper feeder" obtained in step S47, the application 3 sets "cassette A" and "cassette B" except for "AutoSelect" set for the "paper feeder" of the PrintTicket stored in step S46 as choices for the "paper feeder" in a print setting screen 500b (step S48 of FIG. 9). The print setting screen 500b will be shown in FIG. 10B. As shown in the drawing, "cassette A" and "cassette B" are displayed in the pull down list in the input area 523 for the "paper feeder" of the print setting screen 500b. Herein, the user can select any of "cassette A" and "cassette B".

Note that, in the PrintCapabilities output from the printer driver 1 in step S47, "AutoSelect" which can not be set for A4 paper may be not included.

Figure 10A:
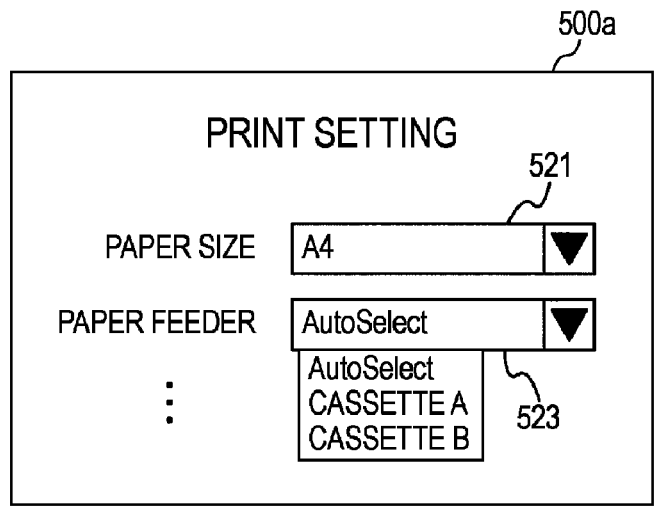
FIG. 10 shows transition of the print setting screen 500 according to the third aspect.
1 printer driver
3 application
5 printer
10 print controlling apparatus
100 PrintTicket
200, 300 PrintCapabilities
500 print setting screen
Figure 10B:
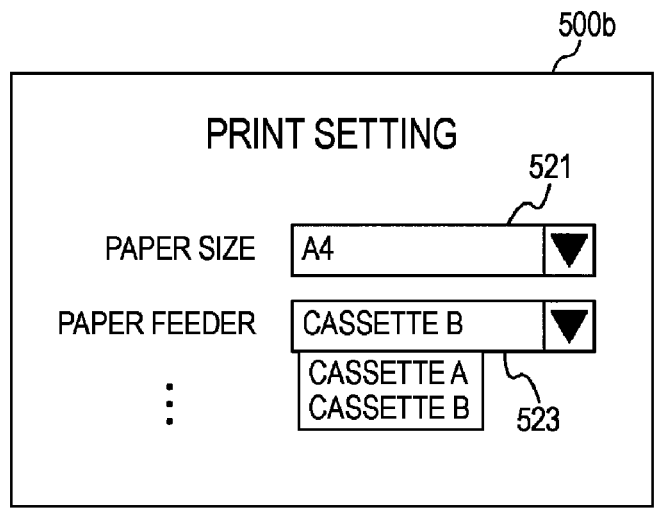
Figure 10C:
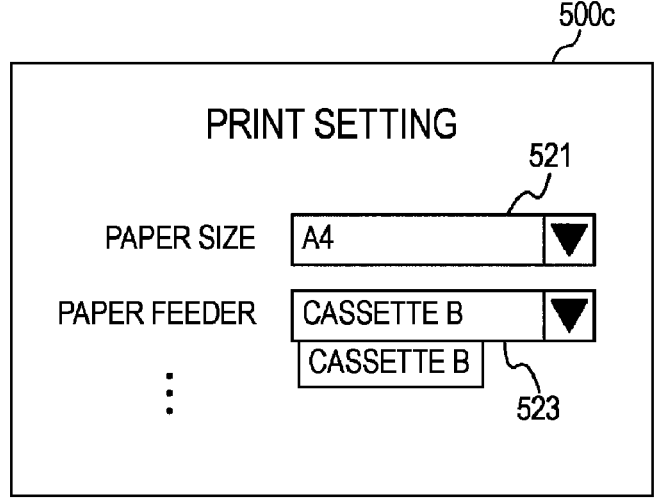

Herein, in FIG. 10B, when the user set "A4" in the input area 521 for the "paper size" and "cassette B" in the input area 523 for the "paper feeder", change, storage, and notice of the PrintTicket is performed again in steps S45, 46 of FIG. 9. At this time, the changed PrintTicket in FIG. 10A is continuously stored.

Herein, in the printer driver 1, the processes of S21 to S23 of FIG. 9 are performed again, and the "paper size" shall be adjusted to "A4" and the "paper feeder" shall be adjusted to "cassette A". That is, when the "paper size" is "A4", "cassette B" shall not be selected for the "paper feeder".

As the result, when it is detected that the PrintTicket notified from the printer driver 1 is adjusted (step S47 in FIG. 9), the application 3 specifies that the adjusted item is the "paper feeder" and obtains setting values (PrintCapabilities) which can be set for the "paper feeder" from the printer driver 1 again (step S48 in FIG. 9).

When "AutoSelect", "cassette A", and "cassette B" are included in the PrintCapabilities for the "paper feeder" obtained again, the application 3 set choices for the "paper feeder" on the print setting screen 500b based on the two PrintTickets stored in step S46 (step S48 of FIG. 9). That is, "cassette B" except for the "AutoSelect", and "cassette A", that is, the setting values set for the "paper feeder" in the changed PrintTicket in FIG. 10A and the changed PrintTicket in FIG. 10B becomes a choice for the "paper feeder" on a print setting screen 500c (step S48 of FIG. 9). Herewith, in the print setting screen 500c shown in FIG. 10C, as shown in the drawing, only "cassette B" is displayed in the pull down list in the input area 523 for the "paper feeder" of the print setting screen 500c.

As described above, according to the third embodiment, as for the setting items to which adjustment is performed by the printer driver 1, it becomes possible to cause the user to execute a try and error by showing the other setting value except for the setting value which is not admitted for setting by the adjustment to the user again.

Note that it is not limited that the print setting screen is displayed by the application as in the aforementioned embodiment and the print setting may be automatically performed inside of the application without displaying the setting screen. In this case, a setting value of each item is not determined by the selection by the user and is set by the application itself.

The aforementioned embodiment of the invention is an example for illustrating the invention. Therefore, the scope of the invention is not limited to the embodiment. A person skilled in the art can perform the invention with other various aspects without departing the gist of the invention.

What is claimed is:

1. A print controlling apparatus for controlling a printer, comprising:
a first notification output unit for outputting a first notification including a setting values for each of a plurality of setting items and a priority order of the plurality of setting items in response to a request form an application;
a second notification output unit for outputting a second notification showing values which can be set as a setting value for each setting item according to the first notification in response to a request from the application;
a third notification obtaining unit for obtaining a third notification that includes the setting value for each of the plurality of setting items and includes a changed setting value changed by the application;
an adjustment unit for judging consistency of the setting values between the plurality of setting items of the obtained third notification, and when there is inconsistency, changing a setting value in accordance with the priority order of the plurality of setting items so that the setting values between the plurality of setting items satisfy consistency; and
an execution unit for causing the printer to execute printing by performing a control based on the setting value for each of the plurality of setting items satisfying consistency when a print request is received from the application.

2. A print controlling apparatus for controlling a printer, comprising:
a first notification output unit for outputting a first notification including a setting value for each of a plurality of setting items in response to a request form an application;
a third notification obtaining unit for obtaining a third notification related to a setting value for any of the setting items and a specification of a priority order of the plurality of setting items from the application;
an adjustment unit for judging consistency of the setting values between the plurality of setting items of the obtained third notification, and when there is inconsistency, changing a setting value in accordance with the priority order of the plurality of setting items obtained by the third notification so that the setting values between the plurality of setting items satisfy consistency; and
an execution unit for causing the printer to execute printing by performing a control based on the setting value for each of the plurality of setting items satisfying consistency when a print request is received from the application.

3. An information processing apparatus comprising:
a first notification obtaining unit for obtaining a first notification including a setting value for each of a plurality of setting items and a priority order of the plurality of setting items from a print controlling apparatus;
a second notification transmitting unit for changing the priority order of the plurality of setting items included in the obtained first notification and for transmitting a second notification including a changed priority order of the plurality of setting items to the print controlling apparatus;
a first display control unit for generating and displaying a print setting screen for receiving a selection of a setting value for each of the setting items from a user based on the changed priority order of the plurality of setting items;
a third notification transmitting unit for creating a third notification including the setting value for each setting item set based on the received selection of the setting value and for transmitting the third notification to the print controlling apparatus;
a forth notification obtaining unit for obtaining a fourth notification including the setting value for each of the plurality of setting items in the print controlling apparatus from the print controlling apparatus after the third notification is transmitted to the print controlling apparatus;

a judging unit for judging whether there is a setting item whose setting value is changed from the setting value included in the first notification among the setting value for each of the plurality of setting items included in the obtained fourth notification;

a fifth notification obtaining unit for obtaining a fifth notification showing values which can be set as a setting value for the setting item whose setting value is changed from the print controlling apparatus when there is a setting item whose setting value is changed as a result of the judgment; and a second display control unit for displaying a setting value included in the obtained fifth notification and set for the setting item whose setting value is changed from the setting value in the first notification on the print setting screen as a setting value which can be selected for the setting item whose setting value is changed on the print setting screen.

4. The information processing apparatus according to claim 3, comprising:

a setting unit for setting the priority order of the plurality of setting items so that the priority order of an setting item becomes higher as the setting item is disposed higher in the print setting screen.

* * * * *